US012621894B2

(12) United States Patent
Hsieh et al.

(10) Patent No.: US 12,621,894 B2
(45) Date of Patent: May 5, 2026

(54) RESUMING A RADIO CONNECTION IN MULTI-RADIO DUAL CONNECTIVITY

(71) Applicant: GOOGLE LLC, Mountain View, CA (US)

(72) Inventors: Ching-Jung Hsieh, Taoyuan City (TW); Chih-Hsiang Wu, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 671 days.

(21) Appl. No.: 17/633,455

(22) PCT Filed: Aug. 4, 2020

(86) PCT No.: PCT/US2020/044819
§ 371 (c)(1),
(2) Date: Feb. 7, 2022

(87) PCT Pub. No.: WO2021/026112
PCT Pub. Date: Feb. 11, 2021

(65) Prior Publication Data
US 2022/0287133 A1      Sep. 8, 2022

Related U.S. Application Data

(60) Provisional application No. 62/884,200, filed on Aug. 8, 2019.

(51) Int. Cl.
*H04W 76/19* (2018.01)
*H04W 76/15* (2018.01)
(Continued)

(52) U.S. Cl.
CPC ........... *H04W 76/19* (2018.02); *H04W 76/15* (2018.02); *H04W 76/20* (2018.02); *H04W 76/30* (2018.02)

(58) Field of Classification Search
CPC ..... H04W 76/19; H04W 76/15; H04W 76/20; H04W 76/30; H04W 76/27; H04W 76/34
See application file for complete search history.

(56) References Cited

U.S. PATENT DOCUMENTS

| 2018/0270791 A1 | 9/2018 | Park et al. |
| 2018/0270894 A1 | 9/2018 | Park et al. |

(Continued)

FOREIGN PATENT DOCUMENTS

| CN | 105659692 A | 6/2016 |
| CN | 107959983 A | 4/2018 |

(Continued)

OTHER PUBLICATIONS

Ericsson, Secondary Node Resume in NE-DC annd NN-DC (TP to 38.300), 3GPP TSG-RAN WG2 #103 R2-1811577, 1-6 (Aug. 2018).

(Continued)

*Primary Examiner* — Kodzovi Acolatse
(74) *Attorney, Agent, or Firm* — MARSHALL, GERSTEIN & BORUN LLP

(57) ABSTRACT

A base station capable of resuming a suspended radio connection between a user device (UE) and a radio access network (RAN) receives a request to resume the suspended radio connection for the UE operating in dual connectivity (DC) with a first master node (MN) and a first secondary node (SN) (602), causes a previous configuration related to at least one of the first MN and the first SN to be released (604), and transmits, to the UE while in the inactive state, a command to resume the suspended radio connection, the command including new configuration related to at least one of the first MN, a second MN, the first SN, or a second SN (606).

21 Claims, 8 Drawing Sheets

(51) Int. Cl.
  H04W 76/20 (2018.01)
  H04W 76/30 (2018.01)

(56) References Cited

U.S. PATENT DOCUMENTS

| | | | | |
|---|---|---|---|---|
| 2018/0368196 | A1 | 12/2018 | Gage | |
| 2019/0174366 | A1 | 6/2019 | Susitaival et al. | |
| 2019/0215748 | A1* | 7/2019 | Zhang | H04W 76/27 |
| 2020/0146089 | A1 | 5/2020 | Li | |
| 2020/0169922 | A1* | 5/2020 | Ozturk | H04W 88/06 |
| 2020/0178208 | A1 | 6/2020 | Kim | |
| 2020/0205123 | A1 | 6/2020 | Byun | |
| 2020/0214073 | A1 | 7/2020 | Shimoda et al. | |
| 2020/0288338 | A1 | 9/2020 | Freda | |
| 2020/0374320 | A1* | 11/2020 | Li | H04L 63/205 |
| 2021/0168896 | A1* | 6/2021 | Wang | H04W 76/27 |
| 2021/0204355 | A1* | 7/2021 | Teyeb | H04L 5/0098 |
| 2021/0385897 | A1* | 12/2021 | Purkayastha | H04W 76/18 |
| 2022/0039186 | A1* | 2/2022 | Ozturk | H04W 72/1263 |
| 2022/0287133 | A1* | 9/2022 | Hsieh | H04W 76/27 |

FOREIGN PATENT DOCUMENTS

| | | | |
|---|---|---|---|
| CN | 109803453 A | 5/2019 | |
| CN | 110089194 A | 8/2019 | |
| EP | 2645803 A1 * | 10/2013 | H04W 76/19 |
| JP | 2019-083563 A | 5/2019 | |
| KR | 2015-0035358 A | 4/2015 | |
| WO | WO-2016/138937 A1 | 9/2016 | |
| WO | WO-2018/057120 A1 | 3/2018 | |
| WO | WO-2018/174791 A1 | 9/2018 | |
| WO | WO-2018/228451 A1 | 12/2018 | |
| WO | WO-2018/232124 A1 | 12/2018 | |
| WO | WO-2019/011057 A1 | 1/2019 | |
| WO | WO-2019/022531 A1 | 1/2019 | |
| WO | WO-2019/031827 A1 | 2/2019 | |
| WO | WO-2019/064114 A1 | 4/2019 | |
| WO | WO-2019/099550 A1 | 5/2019 | |
| WO | WO-2020/065622 A1 | 4/2020 | |
| WO | WO-2020/167170 A1 | 8/2020 | |
| WO | WO-2020/197474 A1 | 10/2020 | |
| WO | WO-2020/231104 A1 | 11/2020 | |

OTHER PUBLICATIONS

Office action for Japanese Patent Application No. 2022-507668, mailing date of Apr. 10, 2023.
First Examination Request for India Application No. 202247011173, dated Jul. 11, 2022.

3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.6.0 (2019).
3rd Generation Partnership Project; Technical Specification Group Radio Access Network; NR; Radio Resource Control (RRC) protocol specification (Release 15), 3GPP TS 38.331 V15.6.0 (2019).
Office Action for European Patent Application No. 20757785.9, dated Mar. 20, 2023.
International Search Report and Written Opinion for Application No. PCT/US2020/044819, dated Oct. 30, 2020.
Office Action for European Patent Application No. 20757785.9, dated Sep. 20, 2023.
"LTE; Evolved Universal Terrestrial Radio Access (E-UTRA) and Evolved Universal Terrestrial Radio Access Network (E-UTRAN); Overall description; Stage 2 (3GPP TS 36.300 version 14.2.0 Release 14)," ETSI TS 136 300 V14.2.0 (Apr. 2017).
3GPP TS 38.423 v15.3.0, "3rd Generation Partnership Project; Technical Specification Group Radio Access Network; NG-RAN; Xn application protocol (XnAP) (Release 15)" (2019).
First Office Action for Chinese Application No. 202080067727.5, dated Oct. 17, 2023.
International Preliminary Report on Patentability for Application No. PCT/US2020/044821, dated Jun. 8, 2021.
International Search Report and Written Opinion for Application No. PCT/US2020/044821, dated Nov. 2, 2020.
Qualcomm Inc., "RRC_Inactive with MR_DC," 3GPP Draft (2018).
Qualcomm Incorporated, "MR-DC in RRC_Inactive State," 3GPP TSG-RAN2#103bis (2018).
Rapporteur (ZTE Corporation), "Agreements for MR-DC with 5GC," 3GPP TSG-RAN WG2 Meeting #104 (2018).
"5G; NG-RAN; Xn Application Protocol (XnAP)," 3GPP TS 38.423 version 15.3.0 Release 15 (2019).
"5G; NR; Overall Description; Stage-2," 3GPP TS 38.300 version 15.5.0 Release 15 (2019).
"5G; NR; Radio Resource Control (RRC); Protocol Specification," 3GPP TS 38.331 version 15.4.0 Release 15 (2019).
"Universal Mobile Telecommunications System (UMTS); LTE; 5G; NR; Multi-Connectivity; Overall Description; Stage-2," 3GPP TS 37.340 version 15.4.0 Release 15 (2019).
"Universal Mobile Telecommunications System (UMTS); LTE; 5G; NR; Multi-Connectivity; Overall Description; Stage-2," 3GPP TS 37.340 version 15.5.0 Release 15 (2019).
Catt, "Resumption of SCG Configuration with RRC Re-establishment and RRC," 3GPP Draft (2019).
Office Action for Chinese Application No. 202080069668.5, dated Oct. 31, 2024.
Office Action for European Patent Application No. 24159103.1, dated Nov. 28, 2024.

* cited by examiner

600

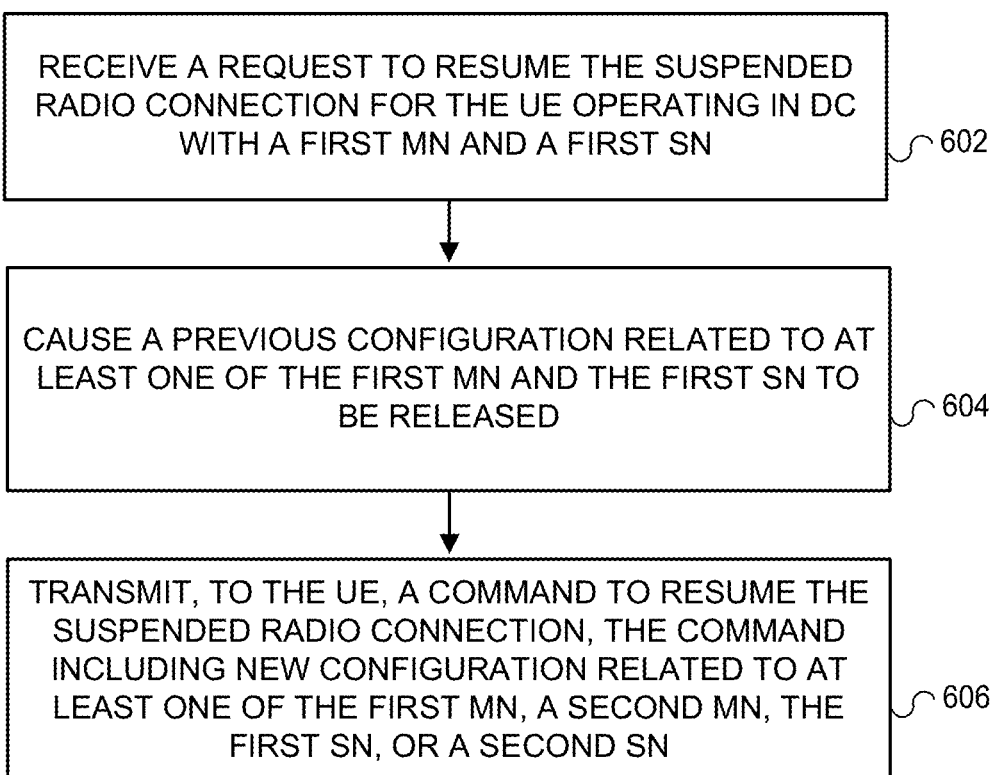

RECEIVE A REQUEST TO RESUME THE SUSPENDED RADIO CONNECTION FOR THE UE OPERATING IN DC WITH A FIRST MN AND A FIRST SN    602

CAUSE A PREVIOUS CONFIGURATION RELATED TO AT LEAST ONE OF THE FIRST MN AND THE FIRST SN TO BE RELEASED    604

TRANSMIT, TO THE UE, A COMMAND TO RESUME THE SUSPENDED RADIO CONNECTION, THE COMMAND INCLUDING NEW CONFIGURATION RELATED TO AT LEAST ONE OF THE FIRST MN, A SECOND MN, THE FIRST SN, OR A SECOND SN    606

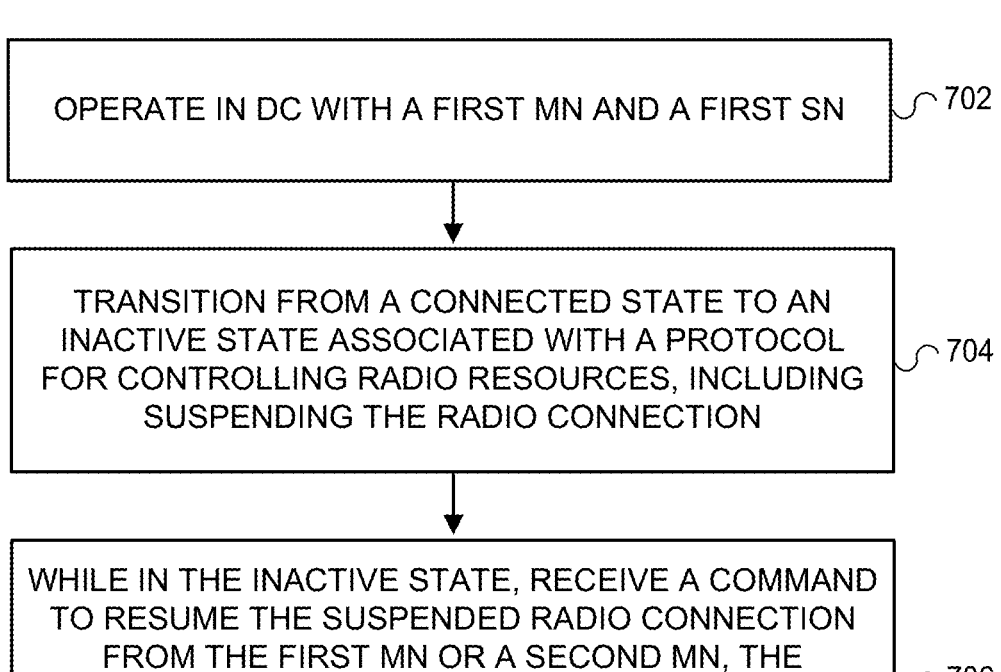

OPERATE IN DC WITH A FIRST MN AND A FIRST SN ⟋702

TRANSITION FROM A CONNECTED STATE TO AN INACTIVE STATE ASSOCIATED WITH A PROTOCOL FOR CONTROLLING RADIO RESOURCES, INCLUDING SUSPENDING THE RADIO CONNECTION ⟋704

WHILE IN THE INACTIVE STATE, RECEIVE A COMMAND TO RESUME THE SUSPENDED RADIO CONNECTION FROM THE FIRST MN OR A SECOND MN, THE COMMAND INCLUDING NEW CONFIGURATION RELATED TO AT LEAST ONE OF THE FIRST MN, THE SECOND MN, THE FIRST SN, OR A SECOND SN ⟋706

Figure 7

RESUMING A RADIO CONNECTION IN MULTI-RADIO DUAL CONNECTIVITY

TECHNICAL FIELD

This disclosure relates generally to wireless communications and, more particularly, to handling an RRC resume request from a communication device.

BACKGROUND

A user device (or user equipment, commonly denoted by acronym "UE") in some cases can concurrently utilize resources of multiple network nodes, e.g., base stations, interconnected by a backhaul. When these network nodes support the same radio access technology (RAT) or different RATs, this type of connectivity is referred to as Dual Connectivity (DC) or Multi-Radio DC (MR-DC), respectively. When a UE operates in DC or MR-DC, one base station operates as a master node (MN), and the other base station operates as a secondary node (SN). The backhaul can support an Xn interface, for example.

The MN can provide a control-plane connection and a user-plane connection to a core network (CN), whereas the SN generally provides a user-plane connection. The cells associated with the MN define a master cell group (MCG), and the cells associated with the SN define a secondary cell group (SCG). The UE and the base stations MN and SN can use signaling radio bearers (SRBs) to exchange radio resource control (RRC) messages, as well as non-access stratum (NAS) messages.

There are several types of SRBs that a UE can use when operating in DC. SRB1 and SRB2 resources allow the UE and the MN to exchange RRC messages related to the MN and to embed RRC messages related to the SN, and can be referred to as MCG SRBs. SRB3 resources allow the UE and the SN to exchange RRC messages related to the SN, and can be referred to as an SCG SRB. Split SRBs allow the UE to exchange RRC messages directly with the MN by using radio resources of the MN, the SN, or both of the MN and SN. Further, the UE and the base stations (e.g., MN and SN) use data radio bearers (DRBs) to transport data on a user plane. DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of both the MN and the SN can be referred to as split DRBs.

A base station (e.g., MN, SN) and/or the CN in some cases causes the UE to transition from one state of the Radio Resource Control (RRC) protocol to another state. More particularly, the UE can operate in an idle state (e.g., EUTRA-RRC_IDLE, NR-RRC IDLE), in which the UE does not have a radio connection with a base station; a connected state (e.g., EUTRA-RRC_CONNECTED, NR-RRC CONNECTED), in which the UE has a radio connection with the base station; or an inactive state (e.g., EUTRA-RRC INACTIVE, NR-RRC INACTIVE), in which the UE has a suspended radio connection with the base station.

In some scenarios, a UE can operate in the connected state and subsequently transition to the inactive state. Generally speaking, in the inactive state, the radio connection between the UE and the radio access network (RAN) is suspended. In response to a network-triggering event, such as when an MN pages the UE (e.g., for an incoming phone call), or when the UE is otherwise triggered to send data (e.g., outgoing phone call, browser launch), the UE can then transition back to the connected state. To carry out the transition, the UE can request that the MN resume the suspended radio connection (e.g., by sending an RRC Resume Request message), so that the MN can configure the UE to again operate in the connected state.

However, due to UE mobility or another factor that affects signal quality, for example, the RAN and/or the UE may decide to change from the MN with which the UE communicated prior to suspending the radio connection (the "old" MN) to another base station. As a result, at the time when the UE attempts to transition back to the active state, another base station can be better suited to serve as an MN (the "new" MN). The UE accordingly can send a request to resume the suspended radio connection to the new MN, which can be within the same RAN notification area as the old MN, or outside that RAN notification area. In any event, the UE can send the request to resume the radio connection to the new MN rather than the old MN.

However, the new MN may be unable to reach the old SN, or the UE can no longer support MR-DC. Further, a new SN in some cases may be more suitable than the old SN to support MR-DC at the UE with either the old MN or the new MN. These example scenarios, as well as certain scenarios in which the UE continues to communicate with the old MN, require certain modifications to the MR-DC operation of the UE.

SUMMARY

According to the techniques of this disclosure, a base station can resume a radio connection between a UE and a RAN, after the UE operating in DC with an MN and an SN transitions to an inactive state. To this end, the base station causes at least some of the previous DC configuration to be released. The released configuration can pertain to the "old" MN (with which the UE communicated prior to transitioning to the inactive state), the "old" SN, or both. The base station then can transmit a command to resume the radio connection to the UE, with a new configuration pertaining to one or more of the old MN, a new MN, the old SN, or a new SN. The base station that can implement these techniques can be the old MN or the new MN.

In some implementations, the old MN that has selected a new SN can resume the MR-DC configuration with the new SN by adding the new SN and releasing the old SN. The old MN then can send an RRC resume message including both old MN and new SN configurations to the UE. As yet another example, the new MN can resume the MR-DC configuration with the old SN by adding the old SN and sending an RRC resume message including both new MN and old SN configurations to the UE. Still another example of these techniques is the new MN resuming the MR-DC configuration with a new SN. The new MN in this case releases the old SN and sends an RRC resume message to the UE having both new MN and new SN configurations.

In some implementations, the new MN that is unable to reach the old SN can release the MR-DC configuration with the old SN by switching SN-terminated bearers to MN-terminated bearers and sending an RRC resume message to the UE. The new MN then operates in a standalone mode, and the UE accordingly communicates with the network in single connectivity.

An example embodiment of these techniques is a method in a base station for resuming a suspended radio connection between a UE and a RAN, which the base station can execute using processing hardware. The method includes receiving a request to resume the suspended radio connection for the UE operating in dual connectivity DC with an old MN and an old SN. The method further includes causing a previous configuration related to at least one of the old MN and the old SN to be released. The method further includes transmitting, to the UE, a command to resume the suspended radio connection, the command including new configuration related to at least one of the old MN, a new MN, the old SN, or a new SN.

Another example embodiment of these techniques is a base station with processing hardware configured to implement the method above.

Another example embodiment of these techniques is a method in a UE, suspended in dual connectivity (DC) operation, for resuming a radio connection with a RAN, which the UE can execute using processing hardware. The method includes transitioning from a connected state to an inactive state associated with a protocol for controlling radio resources, including suspending the radio connection. The method further includes receiving a command to resume the suspended radio connection from the old MN or a new MN while in the inactive state. The command includes new configuration related to at least one of the old MN, the new MN, the old SN, or a new SN.

Another example embodiment of these techniques is an UE with processing hardware configured to implement the method above.

BRIEF DESCRIPTION OF THE DRAWINGS

FIG. 6 is a flow diagram of an example method for resuming a radio connection, which can be implemented in the old MN or new MN of FIG. 1A or FIG. 1B; and FIG. 7 is a flow diagram of an example method for resuming a radio connection with a radio access network (RAN), which can be implemented in the UE of FIG. 1A or FIG. 1B.

DETAILED DESCRIPTION OF THE DRAWINGS

Figure 1A:
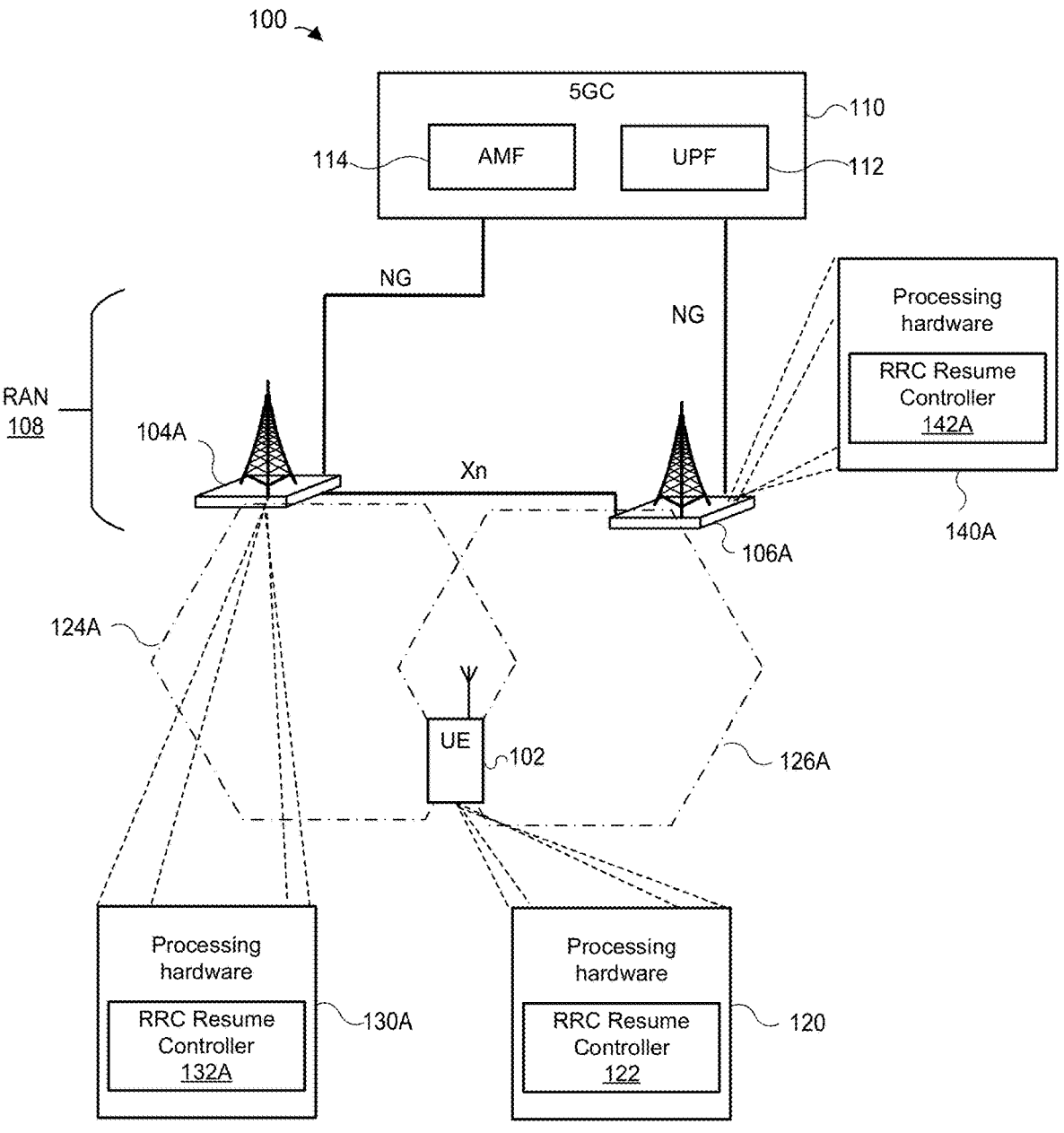
FIGS. 1A and 1B are block diagrams of example systems in which one or more base stations and/or a UE can implement the techniques of this disclosure for resuming a suspended radio connection between the UE and a radio access network (RAN)

FIG. 1A depicts an example wireless communication system 100 in which a UE 102 operates in DC with an MN 104A and an SN 106A of a RAN 108 and, after the UE 102 transitions to an inactive state, the MN 104A and/or the UE 102 resumes a radio connection between the UE 102 and the RAN 108 using the techniques of this disclosure.

In different configurations of the wireless communication system 100, the MN 104A can be implemented as a master eNB (MeNB) or a master gNB (MgNB) node, an SN 106A can be implemented as a secondary eNB (SeNB) or a secondary gNB (SgNB) node, and the UE 102 communicates with the MN 104A and SN 106A via the same RAT such as EUTRA or NR, or different RATs. In some cases, the MeNB or the SeNB is implemented as an ng-eNB rather than an eNB. In any case, the MN 104A and the SN 106A can connect to a CN 110, which can be for example a 5G core network (5GC) or an evolved packet core (EPC). The MN 104A and the SN 106A accordingly can support an S1 interface to communicate with an EPC or NG interface to communicate with a 5GC. Further, to directly exchange messages during the scenarios discussed below, the MN 104A and the SN 106A can support an Xn interface.

As illustrated in FIG. 1A, the MN 104A supports cell 124A, and the SN 106A supports cell 126A. The cells 124A and 126A can partially overlap, so that the UE 102 can communicate in DC with the MN 104A and the SN 106A (throughout the disclosure, "DC" refers to both single-radio or MR-DC). In general, the RAN 108 can include any suitable number of base stations supporting cells 124A and 126A, and an example configuration in which the CN 110 is connected to additional base stations is discussed below with reference to FIG. 1B.

In the example configuration of FIG. 1A, the CN 110 is a 5GC. Among other components, the 5GC 110 includes a User Plane Function (UPF) 112 and an Access and Mobility Management Function (AMF) 114. Generally speaking, the UPF 112 is configured to communicate user-plane packets related to audio calls, video calls, Internet traffic, etc., and the AMF 114 is configured to manage mobility management, authentication, registration, paging, and other related functions. The 5GC 110 may also include a Session Management Function (SMF) which is not shown in FIG. 1A.

Although the examples below refer specifically to a 5GC and specific RAT types, 5G NR and EUTRA, in general the techniques of this disclosure also can apply to other suitable core network types and/or radio access technologies.

The MN 104A is equipped with processing hardware 130A that can include one or more general-purpose processors such as CPUs and non-transitory computer-readable memory storing machine-readable instructions executable on the one or more general-purpose processors, and/or special-purpose processing units. The processing hardware 130A in an example implementation includes an RRC resume controller 132A configured to resume a radio connection between UE 102 and the RAN 108 with a new DC configuration and/or release a previous DC configuration. The SN 106A is equipped with processing hardware 140A that can also include one or more general-purpose processors such as CPUs and non-transitory computer-readable memory storing machine-readable instructions executable on the one or more general-purpose processors, and/or special-purpose processing units. The processing hardware 140A in an example implementation includes an RRC resume controller 142A configured to process an SN addition procedure or SN release procedure in response to an RRC resume request from the UE 102. In general, because a base station can operate as an MN or an SN in different scenarios, the RRC resume controllers 132A and 142A can implement similar sets of functions and support both MN and SN operations.

The UE 102 is equipped with processing hardware 120 that can include one or more general-purpose processors such as CPUs and non-transitory computer-readable memory storing machine-readable instructions executable on the one or more general-purpose processors, and/or special-purpose processing units. The processing hardware 120 in an example implementation includes an RRC resume controller 122 configured to resume a radio connection with the RAN 108 (e.g., MN 104A).

Figure 1B:
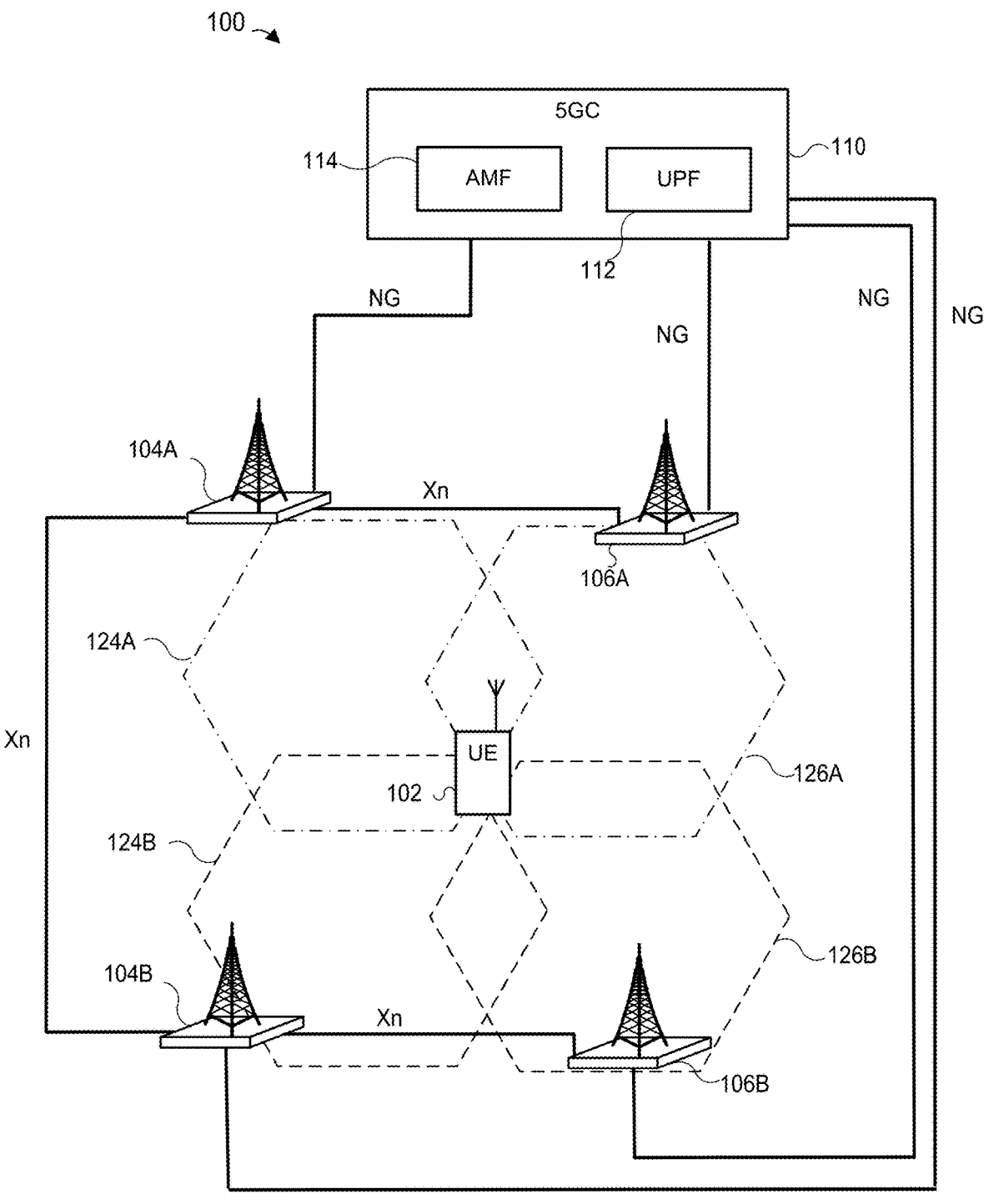

FIG. 1B illustrates another implementation of the network 100, where the CN 110 connects to an MN 104B and an SN 106B in addition to the MN 104A and the SN 106A. Although not shown to avoid clutter, each of the MN 104B and the SN 106B is equipped with processing hardware that includes an RRC resume controller similar to the RRC resume controller 132A or 142A. The MN 104B supports cell 124B, and the SN 106B supports cell 126B. As discussed below, the MNs 104A and 104B can support an inter-MN handover, so that the UE 102 can continue operating in DC after releasing a connection with the MN 104A and selecting cell 124B of the MN 104B, for example.

Several example scenarios in which the base stations operating in the system of FIG. 1A or 1B resume a radio connection between the UE 102 and the RAN 108 are discussed next with reference to FIGS. 2-5.

Figure 2:
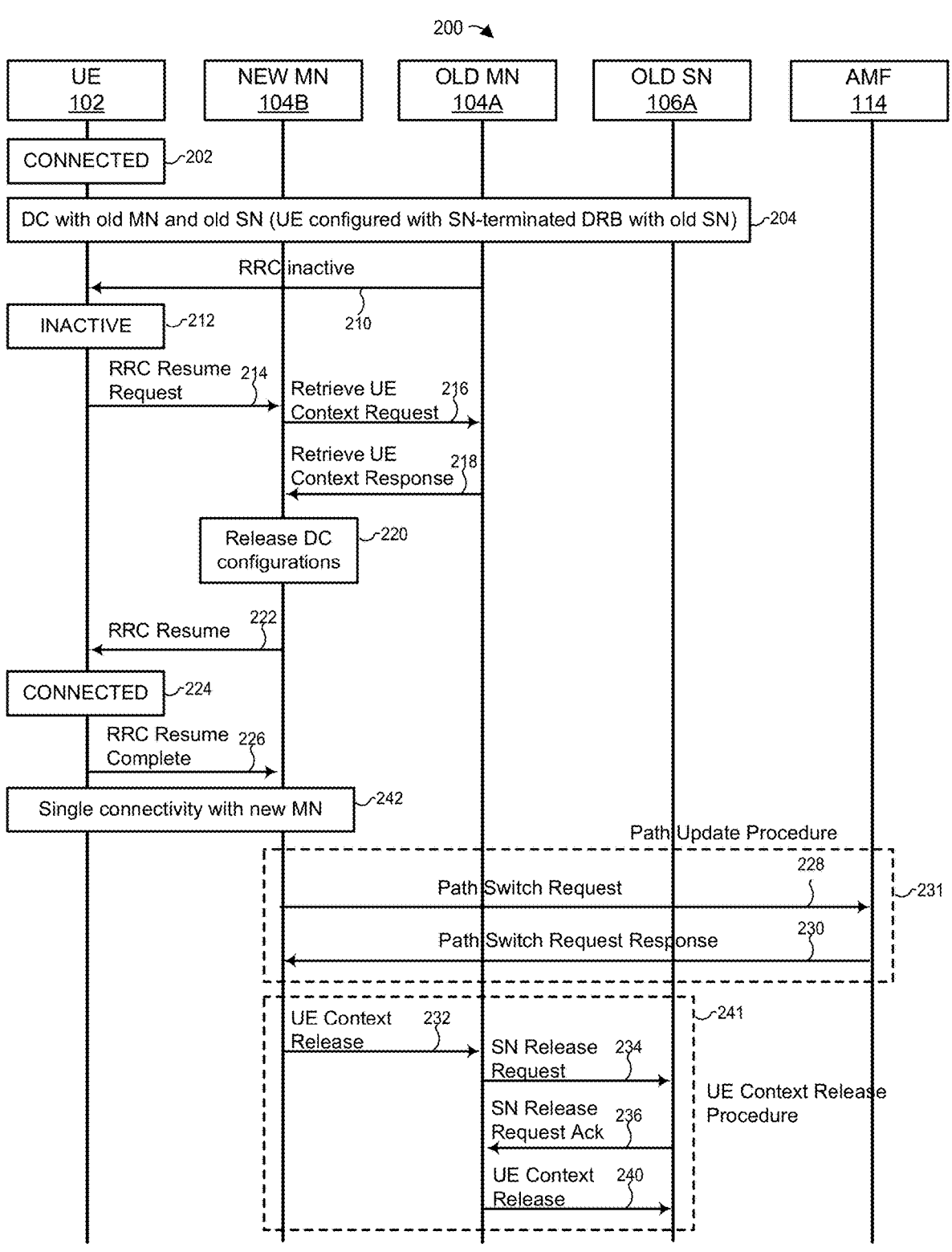
FIG. 2 is a messaging diagram of an example scenario in which a new MN resumes an RRC connection when the UE is in an inactive state, in accordance with the techniques of this disclosure.

First referring to FIG. 2, at the beginning of a scenario 200, the UE 102 operates 202 in a connected state (e.g., EUTRA-RRC_CONNECTED, NR-RRC CONNECTED) with the RAN 108 (e.g., SN 106A and the MN 104A). The SN 106A provides 204 the UE 102 with a DRB terminated at the SN 106A, i.e., an SN-terminated DRB, so that the UE 102 is configured to communicate data with the SN 106A via the SN-terminated DRB and radio resources of the SN 106A. The MN 104A can also provide 204 the UE 102 with a DRB terminated at the MN 104A, i.e., an MN-terminated DRB. Accordingly, MN 104A and SN 106A thus support 204 DC operation at the UE 102.

To configure the SN-terminated DRB so that the UE 102 can communicate with the SN 106A, the SN 106A sends higher-layer DC configuration to the MN 104A, which in turn transmits the higher-layer DC configuration to the UE 102, in one implementation. The higher-layer DC configuration can be a radio bearer configuration (RadioBearerConfig), a DRB-ToAddModList, or a DRB-ToAddMod Information Element (IE), which configures the SN-terminated DRB.

In another implementation, the SN 106A sends lower-layer DC configuration to the MN 104A, which in turn transmits the lower-layer DC configuration to the UE 102. The lower-layer DC configuration can configure a medium access control (MAC) entity, a logical channel with an associated radio link control (RLC) entity, and a primary secondary cell (PSCell). The lower-layer DC configuration can be a CellGroupConfig of an SCG (e.g., cell 126A). The SN 106A can optionally update the lower-layer DC configuration to the UE 102 via the radio resources (e.g., SRB3) of the SN 106A or via radio resources of the MN 104A (e.g., SRB1).

In some implementations, the MN 104A stores a UE context for the UE 102 (e.g., the "UE Context" as defined by the 5G specification). The MN 104A communicates with the UE 102 according to the UE context while the UE 102 is in connected state. For example, the UE context can include a security key, a configuration for an MCG (e.g., the cell 124A), a radio bearer configuration configuring an MN-terminated bearer, the higher-layer DC configuration, and/or the lower-layer DC configuration. Similarly, in some implementations, the SN 106A stores a UE context for the UE 102, which can include the higher-layer DC configuration and/or the lower-layer DC configuration discussed above.

The SN 106A communicates with the UE 102 according to the UE context while the UE 102 is in connected state.

If the MN 104A determines there is no data activity associated with the UE 102 (no traffic to or from the UE 102), the RRC resume controller 132A of the MN 104A transmits 210 an RRC inactive message to cause the UE 102 to change its state from the connected state to the inactive state. In some implementations, the RRC inactive message is an RRCRelease message if the MN 104A is a gNB. In other implementations, the RRC inactive message is an RRCConnectionRelease message if the MN 104A is an ng-eNB.

With continued reference to FIG. 2, upon receiving the RRC inactive message, the UE 102 transitions 212 to the inactive state from the connected state. In response to a trigger event, such as when an MN (e.g., MN 104A) pages the UE 102 (e.g., for an incoming phone call), or when the UE 102 otherwise determines to send data (e.g., for an outgoing phone call or upon browser launch), the UE 102 can then initiate to transition back to the connected state. Before or while initiating the transition, the UE 102 can select a new cell (e.g., the cell 124B) of a new MN (e.g., the MN 104B) instead of selecting the old cell (e.g., the cell 124A) of the old MN (e.g., MN 104A). The MN 104B in an example scenario is better suited to serve the UE 102 than the old MN because the MN 104B is closer to the UE 102. As discussed in further detail below, the MN 104B can facilitate a release of the DC configuration related to the MN 104A and the SN 104A, so that the UE 102 can operate with the MN 104B as a standalone base station. Thus, the UE 102 can send 214 an RRC Resume Request message to the MN 104B, so that the MN 104B can configure the UE 102 to again operate in the connected state.

In response to the RRC Resume Request message, the RRC resume controller 132B of the MN 104B sends 216 a Retrieve UE Context Request message for the UE 102 to the MN 104A. In response, the RRC resume controller 132A of the MN 104A includes the stored UE Context in a Retrieve UE Context Response message and sends 218 the Retrieve UE Context Response message to the MN 104B.

The contents of the Retrieve UE Context Response message can be implementation-specific. In some implementations, the MN 104A includes a HandoverPreparationInformation IE or a CellGroupConfig IE in the Retrieve UE Context Response message. In some implementations, prior to releasing the SN 106A, the MN 104A performs an SN Modification procedure to query the higher-layer DC configuration and/or lower-layer DC configuration stored as UE Context at the SN 104A before the MN 104A includes the HandoverPreparationInformation IE or the CellGroupConfig IE in the Retrieve UE Context Response message. In other implementations, the MN 104A does not perform the SN Modification procedure at all. Further, in some implementations, the MN 104A includes a UE Context Reference IE at the SN 104A (e.g. UE Context Reference at the S-NG-RAN node, including Global NG-RAN Node ID and S-NG-RAN node UE XnAP ID) in the Retrieve UE Context Response message.

The RRC resume controller 132B of the MN 104B then releases 220 the higher-layer DC configuration and the lower-layer DC configuration (if stored) and reconfigures the DRB that was previously terminated at the SN 106A from the SN-terminated bearer to an MN-terminated bearer for a new radio bearer configuration, so that the DRB is terminated at the MN 104B. In some implementations, the MN 104B releases the previous configuration with the SN 106A based on determining that the MN 104A cannot resume at least one layer of the DC configuration of the UE 102 in view of the UE context stored and retrieved from the MN 104A, the received RRC Resume Request message, or other suitable pre-configured deployment metrics. In other implementations, the MN 104B releases the previous configuration with the SN 106A based on determining that the UE 102 is out of coverage of the SN 106A, e.g., according to a positioning measurement made by the MN 104B.

Subsequently, the RRC resume controller 132B of the MN 104B transmits 222 an RRC Resume message to the UE 102. In some implementations, the MN 104B includes the new configuration in the RRC Resume message. For example, the new configuration can include an instruction to release the higher-layer DC configuration (e.g., release an SN-terminated DRB) and reconfigure the DRB from the SN-terminated bearer to the MN-terminated bearer. In some implementations, the new configuration includes one or more of a physical (PHY) layer configuration, a MAC layer configuration, or an RLC configuration for the UE 102 to communicate with the MN 104B.

In response to the RRC Resume message, the RRC resume controller 122 of the UE 102 transitions 224 from the inactive state to the connected state. The RRC resume controller 122 releases the higher-layer DC configuration (e.g., the SN-terminated DRB) and reconfigures the DRB from the SN-terminated bearer to the MN-terminated bearer. In implementations in which the MN 104B included a new higher-layer DC configuration in the RRC resume message to replace the higher-layer DC configuration, the RRC resume controller 122 can replace the higher-layer DC configuration with the new higher-layer DC configuration. For example, the new higher-layer DC configuration can include an instruction to reconfigure one or more (or all) of the SN-terminated bearer(s) to be MN-terminated bearer(s), so that the UE 102 can reconfigure one or more (or all) of the SN-terminated bearer(s) to MN-terminated bearer(s) according to the new higher-layer DC configuration. In some implementations, the RRC resume controller 122 can release the lower-layer DC configuration in response to receiving 210 the RRC inactive message, receiving 222 the RRC Resume message, or transmitting 214 the RRC Resume Request message.

In response to the RRC Resume message, the RRC resume controller 122 sends 226 an indication (e.g., an RRC Resume Complete message) that the UE 102 resumed a radio connection with the RAN in accordance with the new configuration to the MN 104B. In some implementations, the RRC resume controller 122 releases the lower-layer DC configuration in response to sending 226 the RRC Resume Complete message. Accordingly, the MN 104B has 242 single connectivity (SC) with the UE 102 and communicates with the UE 102 via the DRB (i.e., the MN-terminated bearer).

Still referring to FIG. 2, after transmitting 222 the RRC Resume message or receiving 226 the RRC Resume Complete message, the RRC resume controller 132B of the MN 104B performs 231 a path update procedure for redirecting the user plane connection to the new MN. In particular, the RRC resume controller 132B transmits 228 a Path Switch Request message to the AMF 114 of the CN 110. The AMF 114 then transmits 230 a Path Switch Request Response message to the MN 104B.

In some implementations, after transmitting 222 the RRC Resume message or receiving 226 the RRC Resume Complete message, the RRC resume controller 132B performs 241 a UE context release procedure. In particular, the RRC resume controller 132B sends 232 a UE Context Release message to the MN 104A to release the stored UE Context. In response, the RRC resume controller 132A of the MN 104A can optionally send 234 an SN Release Request message (e.g., S-Node Release Request message) to the SN 106A to release the SN 106A for the UE 102. Upon receiving the SN Release Request message, the RRC resume controller 142A can optionally send 236 an SN Release Request Acknowledge message (e.g., S-Node Release Request Acknowledge message) to the MN 104A in response.

After receiving 232 the UE Context Release message from the MN 104B or receiving 236 the SN Release Request Acknowledge message, the RRC resume controller 132A of the MN 104A can send 240 a UE Context Release message to the SN 106A to release the UE Context (e.g., including the higher-layer DC configuration and the lower-layer DC configuration) if stored in the SN 106A.

In some implementations, the RRC resume controller 132B of the MN 104B can perform 241 the UE context release procedure before performing 231 the path update procedure. In other implementations, the RRC resume controller 132B can perform 241 the UE context release procedure after performing 231 the path update procedure.

Figure 3:
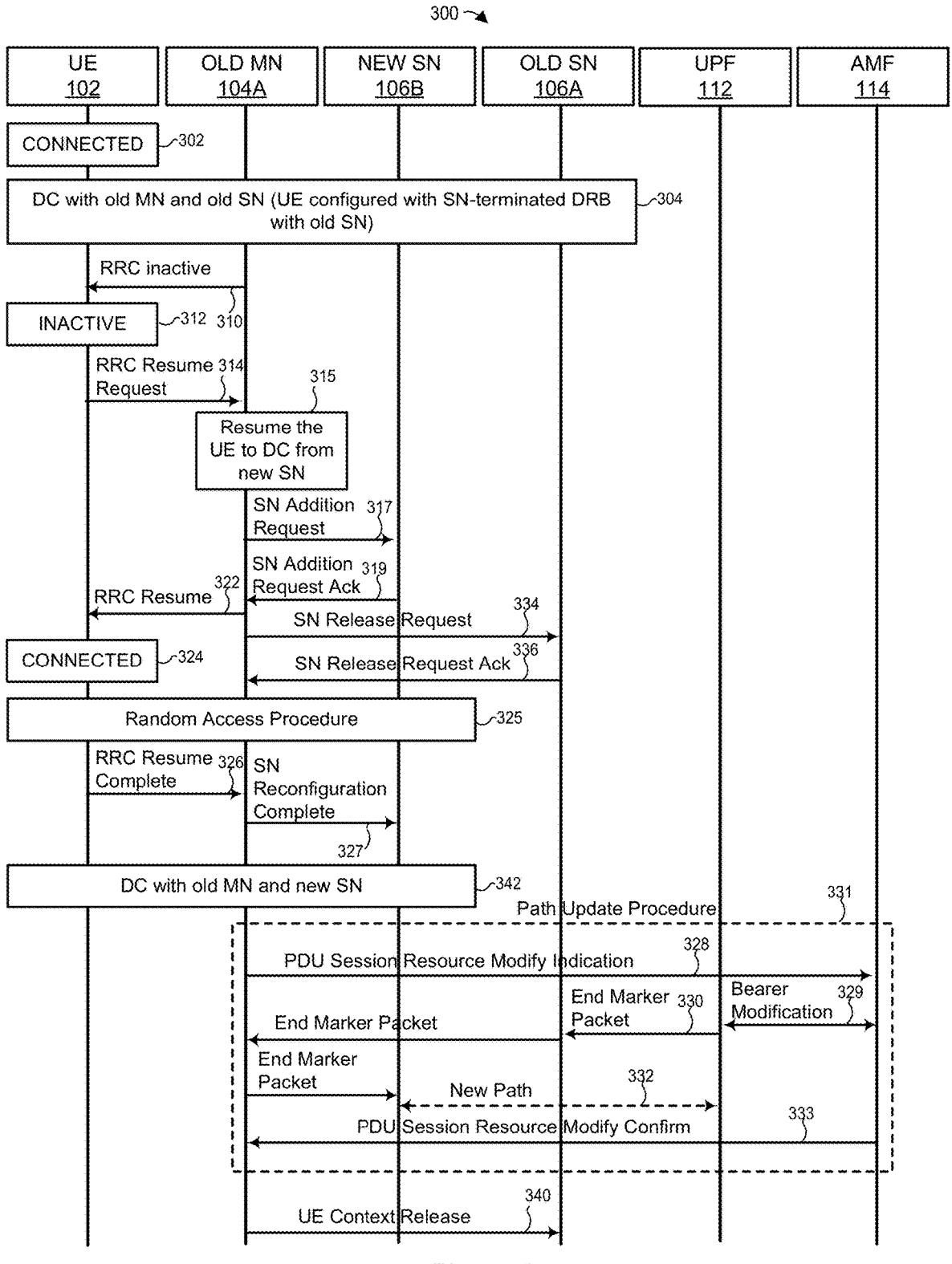
FIG. 3 is a messaging diagram of an example scenario in which an old MN resumes a radio connection with a new SN when the UE is in an inactive state, in accordance with the techniques of this disclosure.

Now referring to FIG. 3, at the beginning of a scenario 300, the UE 102 operates 302 in a connected state with a RAN (e.g., the SN 106A and the MN 104A), similar to event 202 discussed above. Also similar to event 204 discussed above, the MN 104A and the SN 106A support 304 DC at the UE 102.

If the MN 104A determines there is no data activity associated with the UE 102, the RRC resume controller 132A of the MN 104A transmits 310 an RRC inactive message to configure the UE 102 with resources to change its state from the connected state to the inactive state, similar to event 210 discussed above.

Upon the RRC resume controller 122 receiving 310 the RRC inactive message, the UE 102 transitions 312 to the inactive state from the connected state, similar to event 212 discussed above. In response to a trigger event, the UE 102 can then transition back to the connected state. To carry out the transition, the UE 102 can send 314 an RRC Resume Request message to the MN 104A, so that the MN 104A can configure the UE 102 to again operate in the connected state. However, rather than resuming operation in DC with the old SN (e.g., SN 106A), the UE 102 and/or the RAN 108 can determine that a new SN (in this example scenario, the SN 106B) is better suited to service the UE 102 than the old SN. As discussed in further detail below, the MN 104A can facilitate the release of the DC configuration related to the SN 104A, so that the UE 102 can operate with the MN 104A and a new SN (e.g., SN 104B).

In response to receiving 314 the RRC Resume Request message, the RRC resume controller 132A of the MN 104A determines to resume 315 DC at the UE 102 with the SN 106B rather than the old SN 106A. In some implementations, the MN 104A determines to use the SN 106B based on the received RRC Resume Request message or suitable pre-configured deployment metrics.

The RRC resume controller 132A can send 317 an SN Addition Request message (e.g., S-Node Addition Request message) to the RRC resume controller 142B of the SN 106B to request that the SN 106B allocate resources for the UE 102. In some implementations, prior to releasing the SN 106A, the RRC resume controller 132A optionally performs an SN Modification procedure to query the higher-layer DC configuration and/or lower-layer DC configuration stored at the SN 106A, and include the higher-layer DC configuration and/or lower-layer DC configuration in the SN Addition Request message. In some implementations, the SN Addition Request message can include a security key (S-K$_{SN}$) for the SN 106B to communicate with the UE 102.

In turn, the RRC resume controller 142B of the SN 106B sends 319 an SN Addition Request Acknowledge message (e.g., S-node Addition Request Acknowledge message) to the RRC resume controller 132A of the MN 104A. In some implementations, the RRC resume controller 142B includes an SN configuration in the SN Addition Request Acknowledge message. In response, the RRC resume controller 132A sends 322 an RRC Resume message to the UE 102 to configure the UE 102 with a new configuration from both the MN 104A and the SN 106B and replace the previous configuration from the MN 104A and the SN 106A. In some implementations, the MN configuration includes one or more of a PHY layer configuration, a MAC layer configuration, or an RLC configuration, and the SN configuration can include a lower-layer DC configuration. In one implementation, the SN configuration can be an RRC Reconfiguration message (or an RRC Connection Reconfiguration message).

In some implementations, to optionally release the stored UE Context at the SN 106A, the RRC resume controller 132A sends 334 an SN Release Request message to the RRC resume controller 142A of the SN 106A to release the SN 106A for the UE 102. In response, the RRC resume controller 142A can send 336 an SN Release Request Acknowledge message to the RRC resume controller 132A in response, similar to events 234 and 236 discussed above, respectively. Accordingly, the new configuration can include an indication that the DRB terminated at the SN 106A is released. After receiving 336 the SN Release Request Acknowledge message, the RRC resume controller 132A can send 340 a UE Context Release message to the RRC resume controller 142A to release the UE Context in the SN 106A, similar to event 236 discussed above.

In response to the RRC Resume message, the RRC resume controller 122 of the UE 102 transitions 324 from the inactive state to the connected state and performs 325 a random access procedure with the SN 106B. After applying the MN configuration, the RRC resume controller 122 sends 326 an RRC Resume Complete message to the MN 104A, which in turn can optionally send 327 an SN Reconfiguration Complete message to the new SN 106B. In some implementations, the UE 102 includes an RRC Reconfiguration Complete message (or an RRC Connection Reconfiguration Complete message) in the RRC Resume Complete message of event 326, and in turn, the MN 104A includes the RRC Reconfiguration Complete message (or the RRC Connection Reconfiguration Complete) in the SN Reconfiguration Complete message of event 327. In some implementations, the UE 102 sends the RRC Resume Complete message to the MN 104A before performing the random access procedure with the SN 106B. The RRC resume controller 122 may apply the SN configuration before or after sending the RRC Resume Complete message. In one implementation, the UE 102 performs the random access procedure according to a random access configuration included in the SN configuration. Accordingly, the MN 104A supports 342 DC at the UE 102 with the SN 106B in communication with the UE 102 via an SN-terminated DRB.

Still referring to FIG. 3, after the SN 106B receives the SN Reconfiguration Complete message, the MN 104A may perform 331 a path update procedure for redirecting the user plane connection to the new SN. Particularly, the MN 104A can send 328 a Protocol Data Unit (PDU) Session Resource Modify Indication message to the AMF 114 and in response, the AMF 114 can perform 329 a bearer modification procedure with the UPF 112. The UPF 112 can then send 330 end market packets to the SN 106B (via SN 106A and MN 104A), and setup 332 a new path, for at least an SN-terminated bearer, to the SN 106B. The AMF 114 can send a PDU Session Resource Modify Confirm message to the MN 104A to conclude the path update procedure for redirecting the user plane connection to the new SN. Although not shown to avoid clutter, in some implementations, the SN 106A may send a Secondary RAT Data Usage Report message to the SN 106A in response to receiving 334 the SN Release Request message or before receiving 340 the UE Context Release message.

Figure 4:
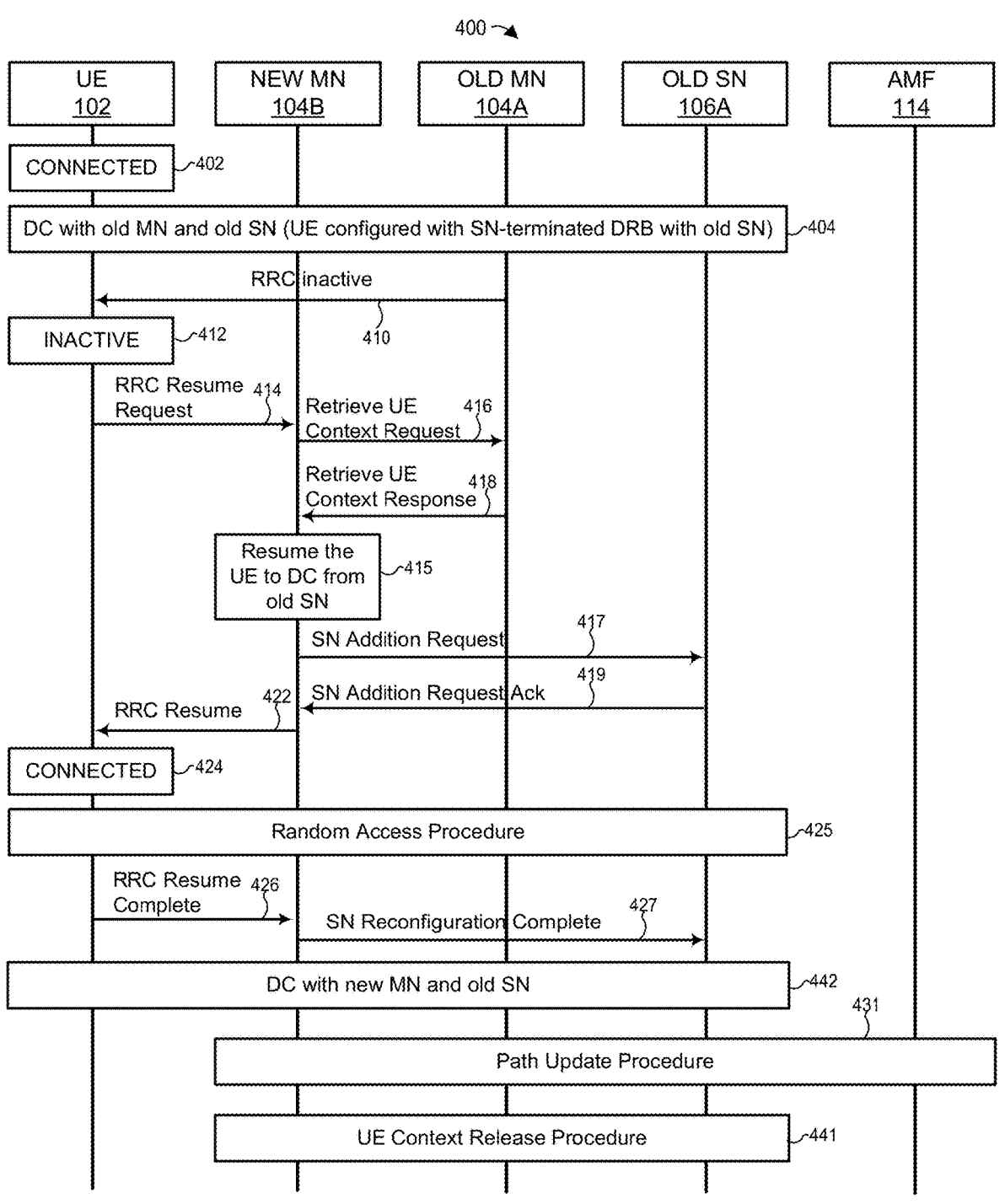
FIG. 4 is a messaging diagram of an example scenario in which a new MN resumes a radio connection with an old SN when the UE is in an inactive state, in accordance with the techniques of this disclosure.

Now referring to FIG. 4, at the beginning of a scenario 400, the UE 102 operates 402 in a connected state with the RAN 108 (e.g., the SN 106A and the MN 104A), similar to events 202 and 302 discussed above. Also similar to events 204 and 304 discussed above, the MN 104A and the SN 106A support 404 DC at the UE 102.

If the MN 104A determines there is no data activity associated with the UE 102, the RRC resume controller 132A of the MN 104A transmits 410 an RRC inactive message to configure the UE 102 with resources to change its state from the connected state to the inactive state, similar to events 210 and 310 discussed above.

Upon receiving the RRC inactive message, the UE 102 transitions 412 to the inactive state from the connected state, similar to events 212 and 312 discussed above. In response to a trigger event, the UE 102 initiates to transition back to the connected state. Before or while initiating the transition, the UE 102 can select a new cell (e.g., cell 124B) of a new MN (e.g., MN 104B) instead of reselecting the old cell (e.g., 124A) of the old MN (e.g., MN 104A). As discussed in further detail below, the MN 104B can cause the DC configuration related to the MN 104A to be released so that the UE 102 can operate with the MN 104B and the SN 106A. Thus, the UE 102 can send 414 an RRC Resume Request message to the MN 104B, so that the MN 104B can configure the UE 102 to again operate in the connected state, similar to event 214 discussed above.

In response to the RRC Resume Request message, the RC resume controller 132B of the MN 104B sends 416 a Retrieve UE Context Request message for the UE 102 to the MN 104A, similar to event 216 discussed above. In response, the RRC resume controller 132A of the MN 104A includes the stored UE Context in a Retrieve UE Context Response message and sends 418 the Retrieve UE Context Response message to the MN 104B, similar to event 218 discussed above.

Subsequently, the MN 104B determines to resume 415 DC at the UE 102 with the SN 106A. In some implementations, the MN 104B determines to use SN 106A based on determining that the MN 104A cannot resume at least one layer of the DC configuration of the UE 102 in view of the UE context stored and retrieved from the MN 104A, the received RRC Resume Request message or suitable pre-configured deployment metrics. In other implementations, the MN 104B determines to use SN 106A based on determining that the UE 102 is still in coverage of the SN 106A, e.g., according to a positioning measurement made by the MN 104B.

The RRC resume controller 132B of the MN 104B can send 417 an SN Addition Request message (e.g., S-Node Addition Request message) to the SN 106A to request the SN 106A to allocate resources (e.g., SN-terminated DRB) for the UE 102. In some implementations, the SN Addition Request message can include a security key (S-K$_{SN}$) for the SN 106A to communicate with the UE 102 and an SN UE XnAP ID as a reference to the UE Context stored in the SN 106A. The MN 104B can receive the SN UE XnAP ID in the Retrieve UE Context Response message.

In turn, the RRC resume controller 142A of the SN 106A sends 419 an SN Addition Request Acknowledge message (e.g., S-node Addition Request Acknowledge message) to the MN 104B. In some implementations, the SN 106A includes an SN configuration in the SN Addition Request Acknowledge message. In response, the RRC resume controller 132B of the MN 104B sends 422 an RRC Resume message to the UE 102 to configure the UE 102 with new configurations from both the MN 104B and SN 106A to replace the previous configuration from the MN 104A and the SN 106A. The new configurations include the MN configuration and the SN configuration. In some implementations, the MN configuration includes one or more of a PHY layer configuration, a MAC layer configuration, or an RLC configuration, and the SN configuration can include a lower-layer DC configuration. In one implementation, the SN configuration can be an RRC Reconfiguration message (or an RRC Connection Reconfiguration message).

In response to the RRC Resume message, the RRC resume controller 122 of the UE 102 transitions 424 from the inactive state to the connected state and performs 425 a random access procedure with the SN 106A. After applying the MN configuration, the RRC resume controller 122 sends 426 an RRC Resume Complete message to the MN 104B, which in turn can optionally send 427 an SN Reconfiguration Complete message to the SN 106A. In some implementations, the UE 102 includes an RRC Reconfiguration Complete message (or an RRC Connection Reconfiguration Complete message) in the RRC Resume Complete message of event 426, and in turn, the MN 104A includes the RRC Reconfiguration Complete message (or the RRC Connection Reconfiguration Complete message) in the SN Reconfiguration Complete message of event 427. In some implementations, the RRC resume controller 122 sends the RRC Resume Complete message to the MN 104B before performing the random access procedure with the SN 106A. The RRC resume controller 122 may apply the SN configuration before or after sending the RRC Resume Complete message. In one implementation, the UE 102 performs the random access procedure according to a random access configuration included in the SN configuration. Accordingly, the MN 104B supports 442 DC at the UE 102, with the SN 106A in communication with the UE 102 via an SN-terminated DRB.

Still referring to FIG. 4, after transmitting 427 the SN Reconfiguration Complete message to the SN 106A or receiving 426 the RRC Resume Complete message, the RRC resume controller 132B of the MN 104B performs 431 a path update procedure for redirecting the user plane connection to the new MN, similar to event 231.

In some implementations, after transmitting 427 the SN Reconfiguration Complete message to the SN 106A or receiving 426 the RRC Resume Complete message, the RRC resume controller 132B performs 441 a UE context release procedure, similar to event 241. Accordingly, the SN 106A can release an MN UE XnAP ID assigned by the MN 104A, the UE-associated signaling connection (or Xn-C connection) associated with the UE 102, an Xn-U connection associated with the UE 102, and/or does not release the radio resources configured by the SN configuration.

Figure 5:
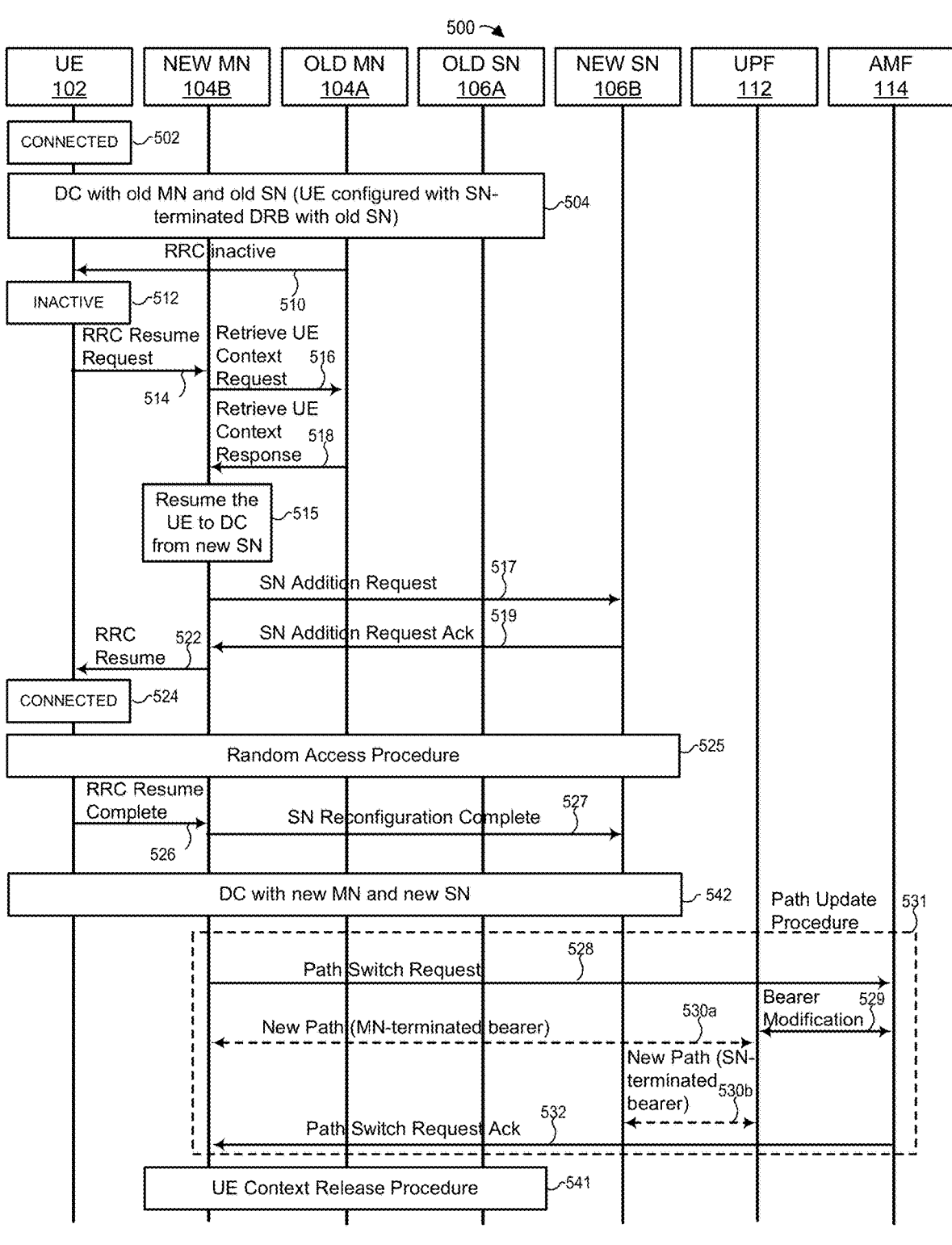
FIG. 5 is a messaging diagram of an example scenario in which a new MN resumes a radio connection with a new SN when the UE is in an inactive state, in accordance with the techniques of this disclosure.

At the beginning of a scenario 500 of FIG. 5, the UE 102 operates 502 in a connected state with the RAN 108 (e.g., the SN 106A and the MN 104A), similar to events 202, 302, and 402 discussed above. Also similar to events 204, 304, and 404 discussed above, the MN 104A and the SN 106A support 504 DC at the UE 102.

If the MN 104A determines there is no data activity associated with the UE 102, the RRC resume controller 132A of the MN 104A transmits 510 an RRC inactive message to configure the UE 102 with resources to change its state from the connected state to the inactive state, similar to events 210, 310, and 410 discussed above.

Upon the RRC resume controller 122 receiving the RRC inactive message, the UE 102 transitions 512 from the inactive state to the connected state, similar to events the 212, 312, and 412 discussed above. In response to a trigger event, the UE 102 can then initiate to transition back to the connected state. Before or while initiating the transition, the UE 102 can select a new cell (e.g., cell 124B) of a new MN (e.g., MN 104B) instead of reselecting the old cell (e.g., 124A) of the old MN (e.g., MN 104A). As discussed in further detail below, the MN 104B can facilitate the release of the DC configuration related to the MN 104A and the SN 104A, so that the UE 102 can operate with the MN 104B and the SN 106B. Thus, the UE 102 can send 514 an RRC Resume Request message to the MN 104B, similar to events 214 and 414 discussed above.

In response to the RRC Resume Request message, the RRC resume controller 132B of the MN 104B sends 516 a Retrieve UE Context Request message for the UE 102 to the MN 104A, similar to events 216 and 416 discussed above. In response, the RRC resume controller 132A of the MN 104A includes the stored UE Context in a Retrieve UE Context Response message and sends 518 the Retrieve UE Context Response message to the MN 104B, similar to events 218 and 418 discussed above.

In response, the RRC resume controller 132B resumes 515 DC at the UE 102 with SN 106B, rather than resuming DC at the UE 102 with the SN 106A. In some implementations, the MN 104B determines to use SN 106B based on the received RRC Resume Request message, the UE context stored and retrieved from the MN 104A, or suitable pre-configured deployment metrics. In other implementations, the MN 104B determines to use SN 106A based on determining that the UE 102 is still in coverage of the SN 106A, e.g., according a positioning measurement made by the MN 104B.

The RRC resume controller 132B can send 517 an SN Addition Request message (e.g., S-Node Addition Request message) to the SN 106B to request the SN 106B to allocate resources for the UE 102. In some implementations, the SN Addition Request message can include a security key (S-K$_{SN}$) for the SN 106B to communicate with the UE 102.

In turn, the RRC resume controller 142B of the SN 106B sends 519 an SN Addition Request Acknowledge message (e.g., S-node Addition Request Acknowledge message) to the MN 104B. In some implementations, the RRC resume controller 142B includes an SN configuration in the SN Addition Request Acknowledge message. In response, the RRC resume controller 132B sends 522 an RRC Resume message to the UE 102 to configure the UE 102 with parameters related to both the MN 104B and the SN 106B and replace the previous configuration from the MN 104A and the SN 106A. The parameters include the MN configuration and the SN configuration. In some implementations, the MN configuration can include one or more of a PHY layer configuration, a MAC layer configuration, or an RLC configuration, and the SN configuration can include a lower-layer DC configuration. In one implementation, the SN configuration can be an RRC Reconfiguration message (or an RRC Connection Reconfiguration message).

In response to the RRC Resume message, the RRC resume controller 122 of the UE 102 transitions 524 from the inactive state to the connected state, and performs 525 a random access procedure with the SN 106B. After applying the MN configuration, the RRC resume controller 122 sends 526 an RRC Resume Complete message to the MN 104B, which in turn can optionally send 527 an SN Reconfiguration Complete message to the SN 106B. In some implementations, the UE 102 includes an RRC Reconfiguration Complete message (or an RRC Connection Reconfiguration Complete message) in the RRC Resume Complete message of event 526, and in turn, the MN 104A includes the RRC Reconfiguration Complete message (or the RRC Connection Reconfiguration Complete message) in the SN Reconfiguration Complete message of event 527. In some implementations, the RRC resume controller 122 sends the RRC Resume Complete message to the MN 104A before performing the random access procedure with the SN 106B. The RRC resume controller 122 may apply the SN configuration before or after sending the RRC Resume Complete message. In one implementation, the UE 102 performs the random access procedure according to a random access configuration included in the SN configuration. Accordingly, the MN 104B supports 542 DC at the UE 102 with the SN 106B in communication with the UE 102 via an SN-terminated DRB.

Still referring to FIG. 5, after transmitting the SN Reconfiguration Complete message to the SN 106B or receiving the RRC Resume Complete message, the RRC resume controller 132B of the MN 104B performs 531 a path update procedure. Particularly, the MN 104B can send 528 a Path Switch Request to the AMF 114 and in response, the AMF 114 can perform 529 a bearer modification procedure with the UPF 112, similar to event 329 of FIG. 3. The UPF 112 setups a new path 530a, for at least an MN-terminated bearer, to the new MN 104B. The UPF 112 setups a new path 530b, for at least an SN-terminated bearer, to the new SN 106B. The UPF 112 can provide 532 a Path Switch Request Acknowledge message to the MN 104B to conclude the path update procedure for redirecting the user plane connections to the new MN and new SN.

In some implementations, after transmitting the SN Reconfiguration Complete message to the SN 106B or receiving the RRC Resume Complete message, the RRC resume controller 132B performs 541 a UE context release procedure, similar to events 241 and 441.

If the MN 104A or MN 104B discussed above in FIGS. 2-5 is an ng-eNB, the RRC Resume Request message is an RRCConnectionResumeRequest message, the RRC Resume message is an RRCConnectionResume message, and the RRC Resume Complete message is an RRCConnectionResumeComplete message. If the MN 104A or MN 104B is a gNB, the RRC Resume Request message is an RRCResumeRequest message, the RRC Resume message is an RRCResume message, and the RRC Resume Complete message is an RRCResumeComplete message.

FIG. 6 depicts an example method 600 for resuming a suspended radio connection between the UE 102 and a RAN. The method 600 begins at block 602, where a base station receives a request to resume the suspended radio connection for the UE operating DC with a first MN and a first SN (events 214, 314, 414, and 514 of FIGS. 2-5). In response to the request, the base station at block 604 causes a previous configuration related to at least one of the first MN and the first SN to be released (events 216, 218, 334, 336, 340, 416, 418, 516, and 518 of FIGS. 2-5). Subsequently, the base station at block 606 transmits, to the UE 102, a command to resume the suspended radio connection (events 222, 322, 422, and 522 of FIGS. 2-5). The command can include new configuration related to at least one of the first MN, a second MN, the first SN, or a second SN.

FIG. 7 depicts an example method 700 for resuming a suspended radio connection between the UE 102 and a RAN.

The method 700 begins at block 702, where a UE operates in DC with a first MN and a first SN (events 204, 304, 404, and 504 of FIGS. 2-5). The UE at block 704 then transitions from a connected state to an inactive state associated with a protocol for controlling radio resources, including suspending the radio connection (events 212, 312, 412, and 512 of FIGS. 2-5). While in the inactive state, the UE at block 706 receives a command to resume the suspended radio connection from the first MN or a second MN (events 222, 322, 422, and 522 of FIGS. 2-5). The command can include new configuration related to at least one of the first MN, the second MN, the first SN, or a second SN.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC), a digital signal processor (DSP)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for resuming a radio connection between a UE and a RAN through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

Aspect 1. A method in a base station for resuming a suspended radio connection between a user equipment (UE) and a radio access network (RAN), the method comprising: receiving, by processing hardware, a request to resume the suspended radio connection for the UE operating in dual connectivity (DC) with a first master node (MN) and a first secondary node (SN); causing, by the processing hardware, a previous configuration related to at least one of the first MN and the first SN to be released; and transmitting, by the processing hardware to the UE, a command to resume the suspended radio connection, the command including new configuration related to at least one of the first MN, a second MN, the first SN, or a second SN.

Aspect 2. The method of aspect 1 implemented in the second MN, wherein causing the previous configuration to be released includes releasing DC configuration of the UE to cause the UE to operate with the second MN as a standalone base station.

Aspect 3. The method of aspect 2, wherein the new configuration includes an indication that a data radio bearer (DRB) terminated at the first SN is reconfigured to terminate at the second MN.

Aspect 4. The method of aspect 1 implemented in the first MN, wherein: causing the previous configuration to be released includes releasing the first SN, and the UE operates in DC with the first MN and the second SN according to the new configuration.

Aspect 5. The method of aspect 1 implemented in the second MN, wherein: causing the previous configuration to be released includes transmitting, to the first MN, a request to release a stored UE context; and the UE operates in DC with the second MN and the first SN according to the new configuration.

Aspect 6. The method of aspect 1 implemented in the second MN, wherein: causing the previous configuration to be released includes: transmitting, to the first MN, a request to release a stored UE context, and releasing the first SN, and the UE operates in DC with the second MN and the second SN according to the new configuration.

Aspect 7. The method of aspects 2, 3, 5, or 6, further comprising: receiving, by the processing hardware, a stored UE context from the first MN; wherein causing the previous configuration to be released is in response to determining, based on the stored UE context, that the first MN cannot resume at least one layer of the DC configuration of the UE.

Aspect 8. The method of aspect 7, further comprising: in response to receiving an indication that the UE resumed the radio connection, transmitting to the first MN a request to release the stored UE context.

Aspect 9. The method of any of aspects 4-6, further comprising: transmitting, by the processing hardware to the first or second SN, a security key for the first or second SN to communicate with the UE.

Aspect 10. The method of aspects 2-4 or 6, wherein the new configuration includes an indication that a DRB terminated at the first SN is released.

Aspect 11. The method of aspect 4 or 6, further comprising: transmitting, by the processing hardware to the second SN, a request to allocate resources for DC operation with the UE.

Aspect 12. The method of aspect 2-4, further comprising, prior to releasing the first SN: querying, by the processing hardware, the first SN to obtain radio bearer configuration stored at the first SN.

Aspect 13. The method of any of the preceding aspects, further comprising: in response to receiving an indication that the UE resumed the radio connection, performing a path switch procedure with a core network (CN).

Aspect 14. The method of any of the preceding aspects, wherein receiving the request to resume the suspended radio connection includes receiving a Radio Resource Control (RRC) Resume Request message from the UE operating in an inactive state associated with an RRC protocol.

Aspect 15. The method of aspect 14, wherein transmitting the command to resume the suspended radio connection to the UE includes transmitting an RRC Resume message.

Aspect 16. The method of any of the preceding aspects, wherein the new configuration includes at least one of: (i) a physical (PHY) layer configuration, (ii) a medium access control (MAC) layer configuration, (iii) a radio link control (RLC) layer configuration, or (iv) a radio bearer configuration.

Aspect 17. The method of any of the preceding aspects, wherein causing the previous configuration to be released is based on at least one of: (i) information in the request to resume the suspended radio connection, (ii) one or more pre-configured deployment metrics, or (iii) a stored context for the UE.

Aspect 18. A base station comprising processing hardware and configured to implement a method of any of aspects 1-17.

Aspect 19. A method in a user equipment (UE) for resuming a radio connection with a radio access network (RAN), suspended in dual connectivity (DC) operation, the method comprising: operating in DC with a first master node (MN) and a first secondary node (SN); transitioning, by processing hardware, from a connected state to an inactive state associated with a protocol for controlling radio resources, including suspending the radio connection; while in the inactive state, receiving a command to resume the suspended radio connection from the first MN or a second MN, the command including new configuration related to at least one of the first MN, the second MN, the first SN, or a second SN.

Aspect 20. The method of aspect 19, wherein: the command to resume the suspended radio connection is received from the second MN; the method further comprising: communicating with the second MN operating as a standalone base station according to the new configuration, wherein the new configuration includes an indication that a data radio bearer (DRB) terminated at the first SN is reconfigured to terminate at the second MN.

Aspect 21. The method of aspect 19, wherein: the command to resume the suspended radio connection is received from the first MN; the method further comprising: communicating in DC with the first MN and the second SN according to the new configuration.

Aspect 22. The method of aspect 19, wherein: the command to resume the suspended radio connection is received from the second MN; the method further comprising: communicating in DC with the second MN and the first SN according to the new configuration.

Aspect 23. The method of aspect 19, wherein: the command to resume the suspended radio connection is received from the second MN; the method further comprising: communicating in DC with the second MN and the second SN according to the new configuration.

Aspect 24. The method of any of aspects 19-23, further comprising: transmitting, to the first MN or the second MN, a Radio Resource Control (RRC) Resume Request message associated with an RRC protocol, wherein receiving the command to resume the suspended radio connection includes receiving an RRC Resume message in response to the transmitted RRC Resume message.

Aspect 25. The method of any of aspects 19-24, wherein the new configuration includes at least one of: (i) a physical (PHY) layer configuration, (ii) a medium access control (MAC) layer configuration, (iii) a radio link control (RLC) layer configuration, or (iv) a radio bearer configuration.

Aspect 26. A user equipment (UE) including processing hardware and configured to implement a method according to any of aspects 19-25.

What is claimed is:

1. A method performed in a second master node (MN) for resuming a suspended radio connection between a user equipment (UE) and a radio access network (RAN), the method comprising:

receiving, by the second MN, a request to resume the suspended radio connection for the UE operating in dual connectivity (DC) with a first master node (MN) and a secondary node (SN);

transmitting, by the second MN and to the first MN, a request to retrieve a stored UE context for the UE;

transmitting, by the second MN and to the SN, a request for the SN to allocate resources for the UE; and transmitting, by the second MN to the UE, a command to resume the suspended radio connection, the command including a new DC configuration to utilize for communicating with the SN, and so that the UE operates in DC with the second MN and the SN according to the new DC configuration.

2. The method of claim 1, further comprising receiving, by the second MN, the stored UE context from the first MN; and wherein the transmitting of the request for the SN to allocate resources for the UE is in response to determining, based on the stored UE context, that the first MN cannot resume at least one layer of the DC configuration of the UE.

3. The method of claim 2, further comprising:

in response to receiving an indication that the UE resumed the radio connection, transmitting, to the first MN, a request to release the stored UE context.

4. The method of claim 1, wherein the receiving of the request to resume the suspended radio connection includes receiving a Radio Resource Control (RRC) Resume Request message from the UE operating in an inactive state associated with an RRC protocol.

5. The method of claim 4, wherein the transmitting of the command to resume the suspended radio connection to the UE includes transmitting an RRC Resume message.

6. The method of claim 1, wherein the transmitting of the request to retrieve the stored UE context is based on at least one of:

(i) information in the request to resume the suspended radio connection, (ii) one or more pre-configured deployment metrics, or (iii) a stored context for the UE.

7. The method of claim 1, further comprising:

in response to receiving an indication that the UE resumed the radio connection, performing a path switch procedure with a core network (CN).

8. The method of claim 1, wherein the new DC configuration includes at least one of: (i) a physical (PHY) layer configuration, (ii) a medium access control (MAC) layer configuration, (iii) a radio link control (RLC) layer configuration, or (iv) a radio bearer configuration.

9. The method of claim 1, further comprising:

transmitting, by the second MN and to the SN, a security key for the SN to communicate with the UE.

10. The method of claim 1, wherein the new DC configuration is a new lower-layer DC configuration.

11. The method of claim 1, wherein the new DC configuration is a new higher-layer DC configuration.

12. The method of claim 1, wherein the transmitting, to the UE, of the command to resume the suspended radio connection is responsive to receiving, by the second MN and from the SN, of an acknowledgement to the request for the SN to allocate resources for the UE.

13. A base station for resuming a suspended radio connection between a user equipment (UE) and a radio access network (RAN), the base station comprising processing hardware configured to:

receive a request to resume the suspended radio connection for the UE operating in dual connectivity (DC) with a first master node (MN) and a secondary node (SN);

transmit, to the first MN, a request to retrieve a stored UE context for the UE;

transmit, to the SN, a request for the SN to allocate resources for the UE; and transmit, to the UE, a command to resume the suspended radio connection, the command including a new DC configuration to utilize for communicating with the SN, and so that the UE operates in DC with the base station and the SN according to the new DC configuration.

14. The base station of claim 13, wherein the new DC configuration is a new lower-layer DC configuration or a new higher-layer DC configuration.

15. A method performed in a user equipment (UE) for resuming a radio connection with a radio access network (RAN), suspended in dual connectivity (DC) operation, the method comprising:

operating in DC with a first master node (MN) and a secondary node (SN);

transitioning, by the UE, from a connected state into an inactive state associated with a protocol for controlling radio resources, including suspending the radio connection;

while in the inactive state, receiving, from a second MN, a command to resume the suspended radio connection, the command including a new DC configuration for the UE to utilize for communicating with the SN;

replacing, by the UE, a previous DC configuration used by the UE to communicate with the SN with the new DC configuration; and communicating in DC with the second MN and the SN according to the new DC configuration.

16. The method of claim 15, further comprising transmitting, by the UE and to the second MN, a Radio Resource Control (RRC) Resume Request message associated with an RRC protocol; and

| wherein the receiving of the command to resume the suspended radio connection includes receiving an RRC Resume message in response to the transmitted RRC Resume message.

17. The method of claim 15, wherein the new DC configuration includes at least one of:

(i) a physical (PHY) layer configuration, (ii) a medium access control (MAC) layer configuration, (iii) a radio link control (RLC) layer configuration, or (iv) a radio bearer configuration.

18. The method of claim 15, wherein the new DC configuration is a new lower-layer DC configuration.

19. The method of claim 15, wherein the new DC configuration is a new higher-layer DC configuration.

20. A user equipment (UE) for resuming a suspended radio connection between the UE and a radio access network (RAN), the UE comprising processing hardware configured to:

operate in DC with a first master node (MN) and a secondary node (SN);

transition from a connected state into an inactive state associated with a protocol for controlling radio resources, including suspending the radio connection;

while in the inactive state, receive, from a second MN, a command to resume the suspended radio connection, the command including a new DC configuration for the UE to utilize for communicating with the SN;

replace a previous DC configuration used by the UE to communicate with the SN with the new DC configuration; and communicate in DC with the second MN and the SN according to the new DC configuration.

21. The UE of claim 20, wherein the new DC configuration is a new lower-layer DC configuration or a new higher-layer DC configuration.

* * * * *